Sept. 27, 1966 C. J. CARLSON, JR., ETAL 3,275,890

TRANSFORMERS EQUIPPED WITH CIRCUIT INTERRUPTER

Filed Aug. 20, 1963 4 Sheets-Sheet 1

INVENTORS
CHARLES J. CARLSON JR.
DONALD J. FARMER
BY Laurence M. Goodridge
ATTORNEY.

TRANSFORMERS EQUIPPED WITH CIRCUIT INTERRUPTER

Filed Aug. 20, 1963

4 Sheets-Sheet 2

INVENTORS
CHARLES J. CARLSON JR
DONALD J. FARMER
BY Laurence M. Goodridge
ATTORNEY.

Sept. 27, 1966 C. J. CARLSON, JR., ETAL 3,275,890

TRANSFORMERS EQUIPPED WITH CIRCUIT INTERRUPTER

Filed Aug. 20, 1963 4 Sheets-Sheet 3

INVENTORS
CHARLES J. CARLSON JR.
BY DONALD J. FARMER
Laurence M. Goodridge
ATTORNEY

TRANSFORMERS EQUIPPED WITH CIRCUIT INTERRUPTER

Filed Aug. 20, 1963 4 Sheets-Sheet 4

INVENTORS
CHARLES J. CARLSON JR.
DONALD J. FARMER
BY
Laurence M. Goodridge
ATTORNEY.

United States Patent Office 3,275,890

Patented Sept. 27, 1966

3,275,890

TRANSFORMERS EQUIPPED WITH CIRCUIT INTERRUPTER

Charles J. Carlson, Jr., and Donald J. Farmer, Pine Bluff, Ark., assignors to Central Transformer Corporation, Pine Bluff, Ark., a corporation of Arkansas Filed Aug. 20, 1963, Ser. No. 303,368

1 Claim. (Cl. 317—15)

This invention relates to improvements in electrical transformers and more particularly to electric transformers which are equipped with circuit interrupter gear, especially transformers of the type which are enclosed in a fluid filled housing. In this type of equipment, the electric components of the transformer are enclosed in a housing filled with a fluid of high dielectric strength to a level submerging the electric components, or at least some of them. Usually this fluid is oil, but it can be a halogen compound gas. The oil, or gas, as the case may be, is an insulating and cooling medium for the components of the transformer. Any one of the halogen compound gases, such as $SF_6$, $C_3F_8$, $C_4F_8$, or $C_4F_{10}$, could be used as well as oil, and will have the same dielectric strength as oil at pressures of two to three atmospheres. All of these gases, as well as oil, have the ability to quench an arc which is a decided advantage in their favor when applied to such a use.

In an electric distribution system, high voltage is supplied to a plurality of transformers which in turn step down the voltage for ultimate consumer usage. There are various high voltage systems used to supply current to a plurality of transformers for this purpose, for example, some are three phase delta or Y loop connected and others, single phase double loop connected, or grounded Y connected. Whatever the system however, each transformer should have a corresponding circuit interrupter capable of sectionalizing the power supply through the loop connection in case a fault develops in a transformer, or in the loop connection. Such circuit interrupter gear is usually placed inside or outside of the transformer housing. If placed outside, the circuit interrupter is usually of the air break type; if inside, it is usually submerged in the fluid of the transformer housing so that the fluid quenches the arc.

If the circuit interrupter is outside the housing, and of the air break kind, it occupies considerable space and may require a load break type of tool for safe operation. Where the fluid is oil in the transformer and the circuit interrupter is inside, submerged in the oil, it has been established that certain risks are involved, particularly after the circuit interrupter has been operated a number of times. A certain amount of metal is vaporized, a certain amount of free carbon is formed, and a certain amount of acidity, which causes sludging in the oil, etc., is added to the oil. This is unavoidable because some arcing between contacts carrying a heavy load at high voltage is bound to occur with every opening. The presence of these contaminants constitute a risk increasing the possibility of fire, or explosion in the transformer, during load break operations, or a loss of transformer life, if the oil is not filtered or replaced.

It is the object of this invention to provide a transformer equipped with circuit interrupter gear which obviates the disadvantages of the above-described types.

It is another object of this invention to provide a circuit interrupter gear which may be applied to the transformer either inside, outside, or partially inside, or partially outside, of the transformer housing, which gear avoids the disadvantages of the above-described types.

It is still another object of this invention to provide an enclosed circuit interrupter unit containing an arc quenching dielectric fluid of one kind or another for installation on a transformer housing filled with a dielectric fluid of still another kind, and yet eliminate any possibility of dilution of one fluid by the other.

According to this invention, a fluid tight housing encloses the electric components of a transformer, and these components, or most of them, are submerged in a fluid of high dielectric strength contained within that housing. At one or more locations, this housing is provided with an opening surrounded by a mounting pad, which opening is closed by a mounting plate. A second housing containing a circuit interrupter of a known type suitable for interrupting a high voltage circuit under load is detachably mounted on the plate. The second housing is also charged with a fluid having high dielectric strength, but preferably of a different kind than in the housing and at a different pressure. One or more conductors in separate insulating bushings projecting inwardly of the plate connect with the primary transformer windings. The second housing contains circuit interrupter gear which has a fully enclosed electric output connection, or connections, with the conductor, or conductors, in the plate. On the housing are projecting electric input terminals suround by individual bushings of insulating material. The enclosed circuit interrupter is a disconnect between output and input connections. This arrangement is such that the second housing and its enclosed gear may be readily replaced and leakage of dielectric fluid from one housing to the other avoided, especially from the transformer housing to the switch housing.

The mounting plate described can be generally flat, in which case the second housing is on the outside of the first, or it may be cup-shaped to recess the second housing partly, or fully, within the first. As above stated, the first housing may be provided with two mounting pads to provide for alternative location of the second housing enclosing the circuit interrupter gear.

Other objects and advantages of this invention will appear from the following detailed description which is in such clear, concise and exact terms as will enable any person skilled in the art to make and use the same when taken in conjunction with the accompanying drawings forming a part thereof and in which.

Figure 1:
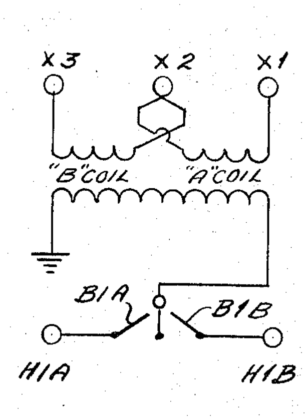
FIGS. 1–4 are diagrammatic illustrations of various transformer circuits.

Turning now to the drawings, FIGS. 1–4 illustrate diagrammatically four different transformer circuits. That shown in FIG. 1 is a single phase single wire, or single loop feed, using a grounded Y connection with a single pole double switch to control the high voltage input connecting with two terminals H1A and H1B. The secondary in the transformer has one coil with two equal sections connected with output terminals $X_1$–$X_2$–$X_3$. This provides, for example, three output feeder line connections, between $X_1$–$X_2$ and $X_2$–$X_3$, one hundred twenty volts and, between $X_1$–$X_3$, two hundred and forty volts.

Figure 2:
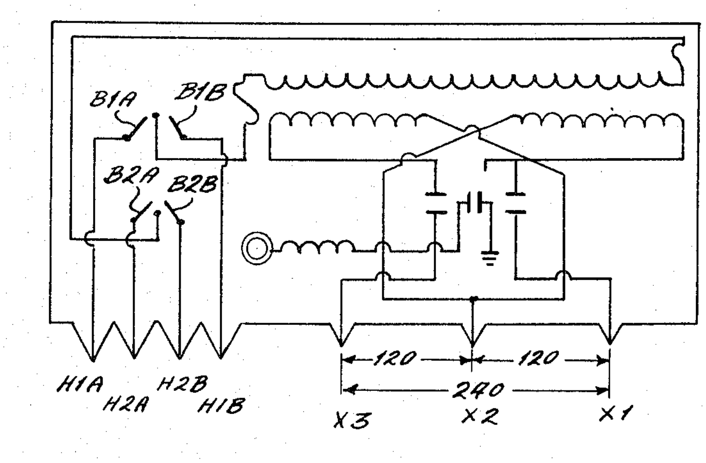

The diagram in FIG. 2 is a single phase double wire, or double loop, connected feed with one high voltage loop input connecting terminals H1A–H2A and the other high voltage loop input connecting terminals H1B–H2B. The two wire double loop system has a neutral and requires two pairs of high voltage terminals instead of one pair, and a two pole double switch instead of a single pole double switch as in FIG. 1. Otherwise, the circuit is basically the same.

Figures 3, 4:
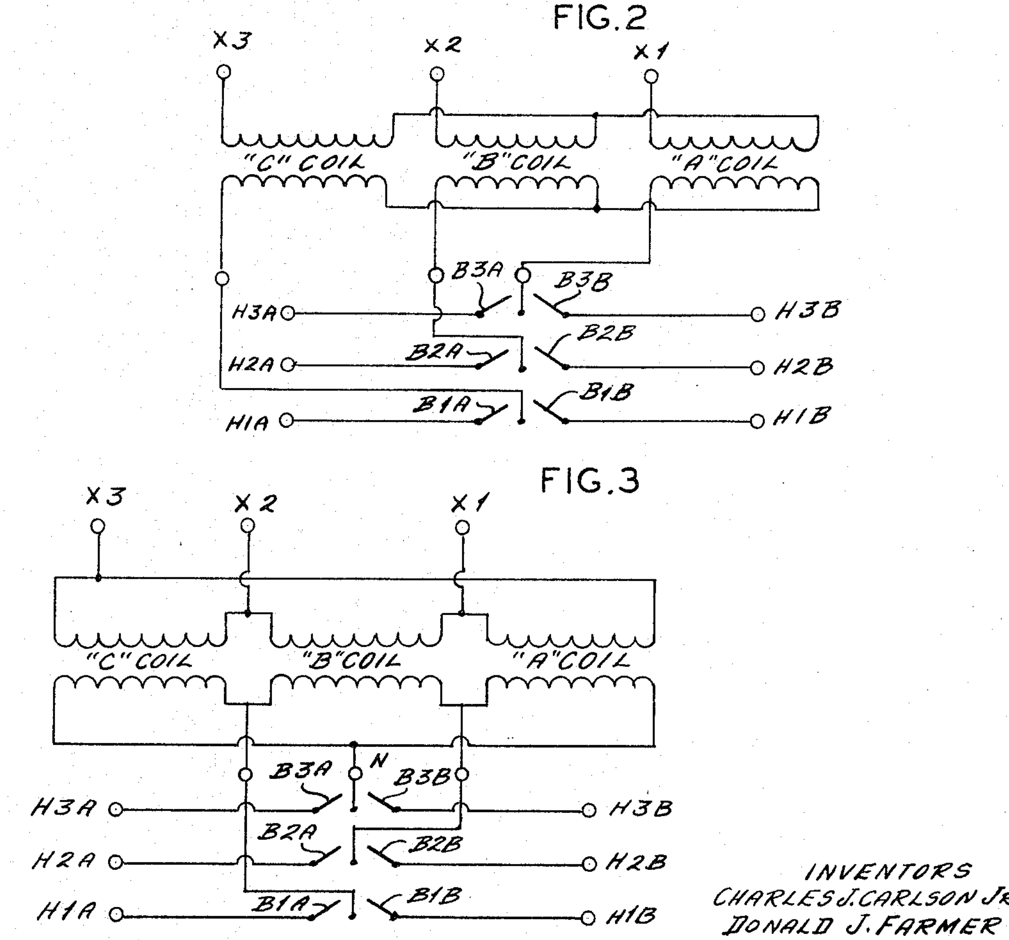

The diagrams in FIGS. 3 and 4 are three phase, three wire or triple loop connected feed with high voltage loop input connections to three pairs of high voltage terminals H1A–H1B, H2A–H2B and H3A–H3B. The three phase system requires three pairs of high voltage terminals and a triple pole double switch.

Insofar as this invention is concerned, it can be applied to transformers using any one of the above systems, or others by merely duplicating the pairs of high voltage terminals and the number of poles of the double type switch in the circuit. The circuit interrupter can be a blade switch or a disconnect of any other kind. The construction, hereinafter described in detail, will employ the system diagrammed in FIG. 1 because of its simplicity, but, by duplicating the parts and enlarging others, the structure described can be applied to the system diagrammed in FIG. 2, or by trebling parts and enlarging others, to the system diagrammed in FIGS. 3 and 4.

Figure 5:
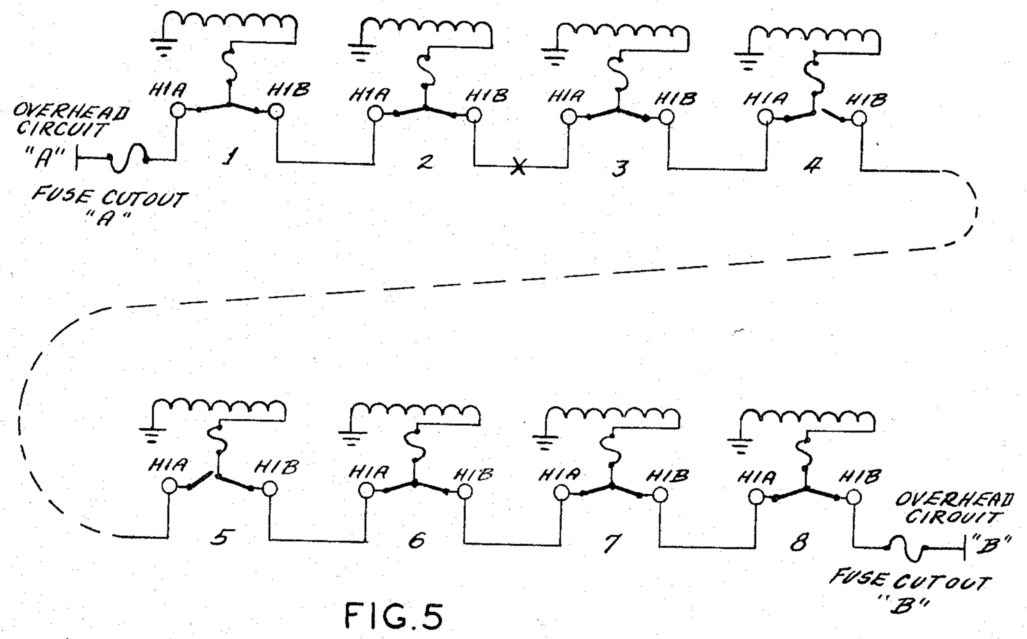
FIG. 5 is a diagrammatic illustration of electric distribution by loop system-grounded Y.

If the system, diagrammed in FIG. 1, is to be used, the chances are the transformers would be group connected in a manner diagrammed in FIG. 5. The advantage of such a system is that should a fault occur at X the sectionalizing provided by the circuit interrupters makes it possible to isolate the fault until repair by opening H1A on transformer No. 3 and H1B on transformer No. 2. Thereafter H1A can be closed on No. 5 and H1B on No. 4 to restore power to all of the transformers while fault X is repaired. The same general system would be followed if the systems were double loop or triple loop connected.

Figure 6:
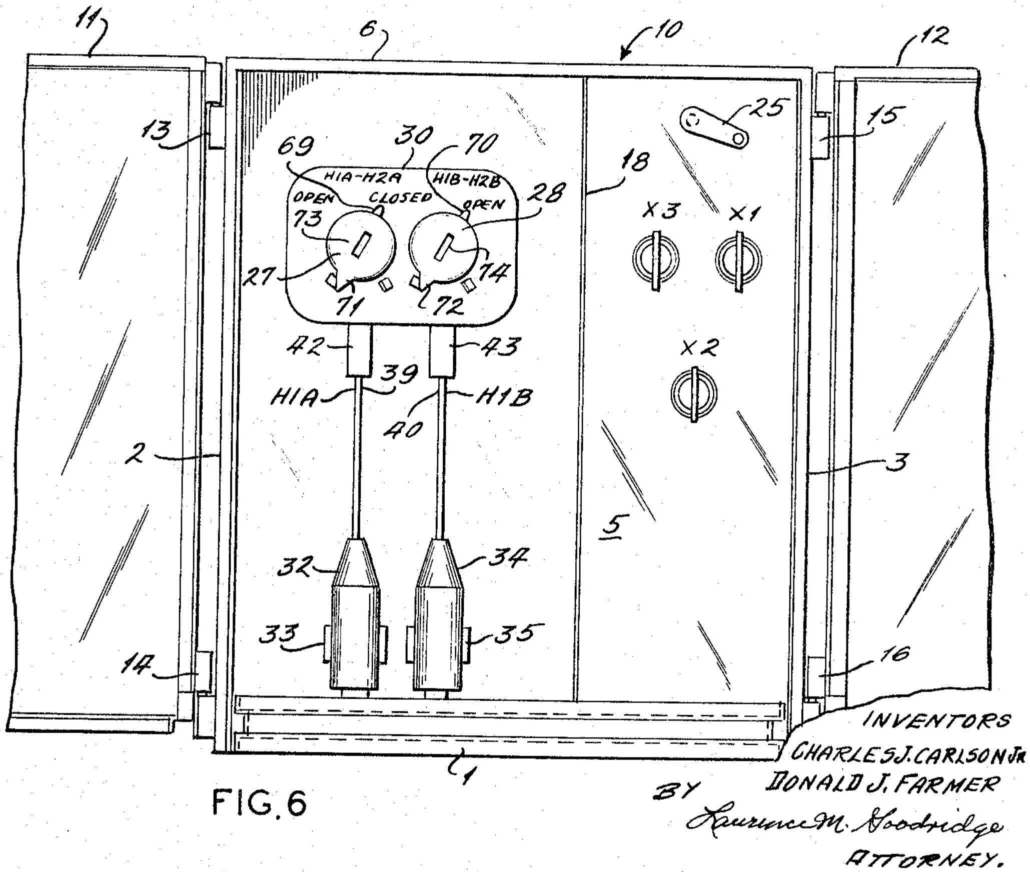
FIG. 6 is a front elevational view of a transformer with the doors open.
Figures 7, 8, 9:
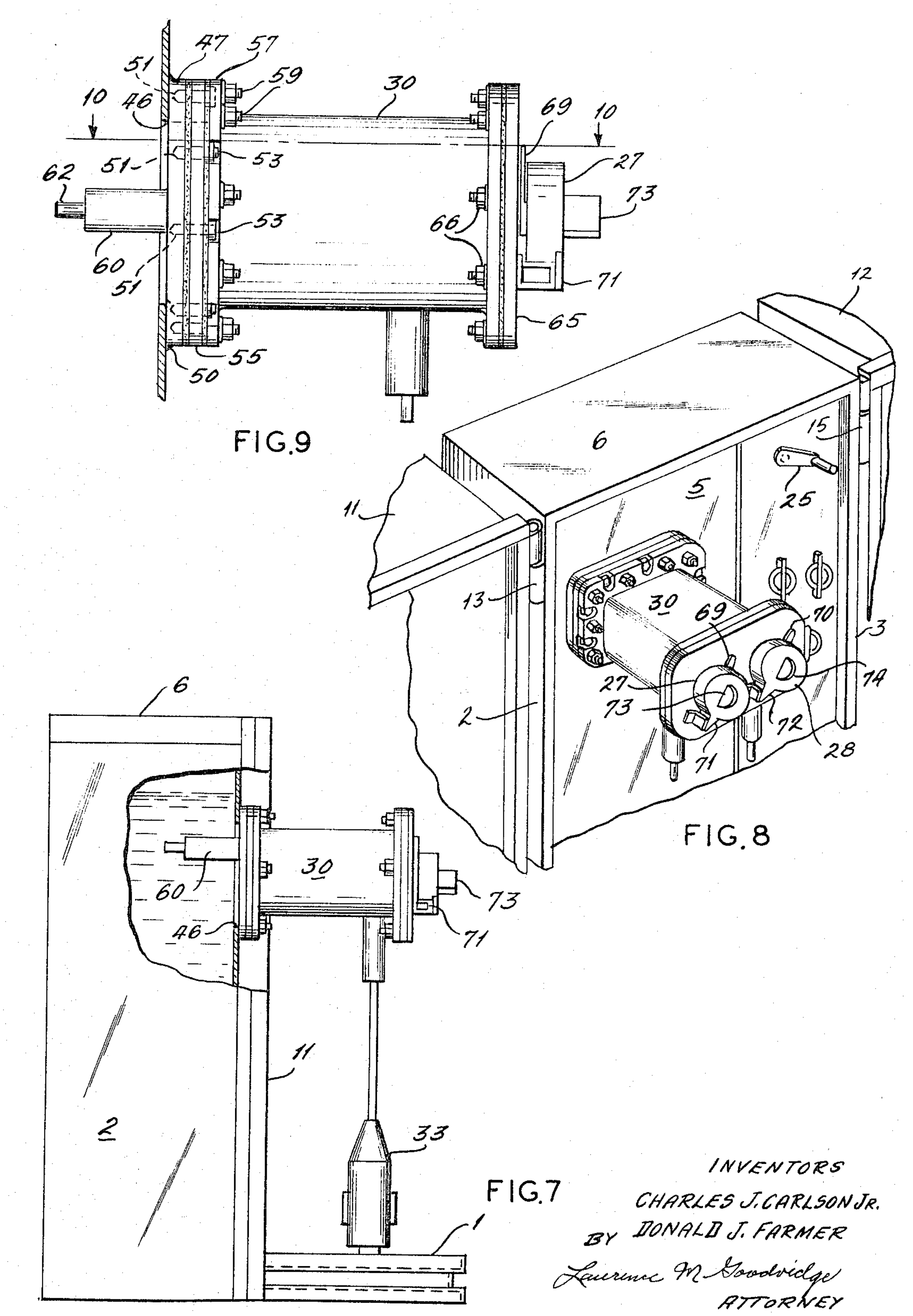
FIG. 7 is a side elevational view of the transformer shown in FIG. 6.
FIG. 8 is a perspective view of a fragmentary portion of the front panel of the transformer shown in FIG. 6 on an enlarged scale and with the doors opened.
FIG. 9 is a fragmentary view in side elevation showing the circuit interrupter housing in FIGS. 6–8 on an enlarged scale.

FIGS. 6 and 7 show a pad mounted transformer to which this invention is applied, and are intended to be illustrative only. This transformer has a fluid tight housing 10 with a base 1 enclosed by side panels 2 and 3, back 4, front panel 5 and top 6. The portion of the base 1 projecting beyond front panel 5 and this panel 5 are concealed by a pair of doors 11 and 12 mounted on pairs of hinges 13–14 and 15–16, respectively. Door 11 conceals the high voltage side of panel 5 and door 12 the low voltage side. Actually these two sides of the panel 5 are separated by a partition 18 to isolate the high voltage side when door 12 is opened so that safe access may be had to the low voltage side of panel 5. With the door 12 open, terminals $X_1$–$X_2$–$X_3$ are exposed as well as a breaker operating handle 25 which will open the circuit from the transformer to the low voltage terminals.

When door 11 is opened, access may be had directly to the circuit interrupter operating knobs 27 and 28 which are mounted on circuit interrupter casing 30. Below the circuit interrupter casing 30 are a pair of pot heads 32 and 34 supported in brackets 33 and 35, respectively. Leads 39 and 40 connect with the upper ends of the pot heads and extend through bushings 42 and 43 projecting from the bottom of the circuit interrupter casing 30. It is understood that the pot heads 32 and 34 are provided for connection with high voltage loop distribution system A or B shown in FIG. 5. Pot head 32 corresponds with terminal H1A shown in FIG. 1. Pot head 34 corresponds with terminal H1B, shown in FIG. 1. Knob 27 operates the circuit interrupter to connect and disconnect the transformer primary from lead in H1A. Knob 28 operates the circuit interrupter to connect and disconnect the transformer primary from H1B.

FIGS. 8 and 9 show the circuit interrupter housing 30 and its mounting on the transformer housing. Opening 46 in the front panel 5 is surrounded by a mounting pad 47 welded to the panel at its periphery, as at 50. Spaced tapped holes 51 are located in the front face of the mounting pad. Some of these holes receive studs 53 which are in similar spaced holes at the periphery of mounting plate 55. A gasket forms a seal between the mounting pad and the mounting plate 55. Flange 57 on housing 30 is apertured around its periphery to receive the heads of studs 53 and to also receive studs 59 which screw into other of the holes 51 in the mounting pad 47. A gasket fills the joint between flange 57 and plate 55. Preferably, the plate 55 carries a bushing 60. The bushing 60 is an insulator for a high voltage conductor 62 connecting through suitable fuses with the primary coil of the transformer. Bushings 60 and 42–43 are made of the same insulating material as the housing 30. A material, such as molded fiber glass, impregnated with a synthetic resin, a phenolic or vinyl resin.

The front end of casing 30 is closed by a face plate 65 of insulating material held on by the bolts 66, as shown in FIG. 9. Rotatable on the face plate are knobs 27 and 28 provided with pointers 69 and 70 and stops 71 and 72. Knobs 27, 28 can be rotated by a "hot stick" engaging tabs 73 or 74, as the case may be. Preferably, plate 65 is a transparent resin insulating material so that the circuit interrupter elements are visible as well as the off and on indica adjacent pointers 69 and 70.

Figures 10, 11, 12:
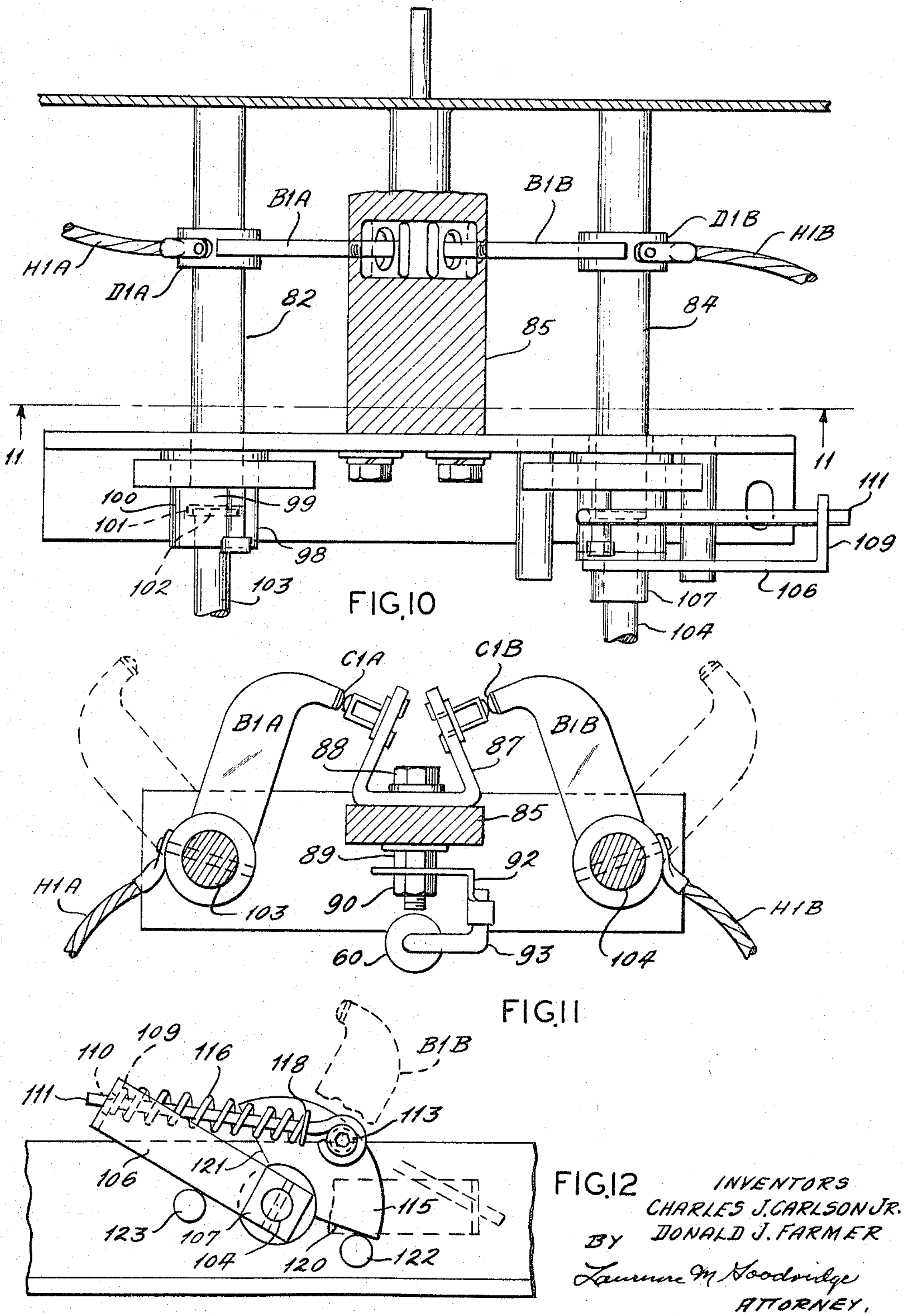
FIG. 10 is a view partly in section taken on the line 10—10 on FIG. 9 looking in the direction of the arrows.
FIG. 11 is a view partly in section taken on the line 11—11 of FIG. 10.
FIG. 12 is a schematic illustration of a quick make and break mechanism suitable for operating the circuit interrupter contacts.

Referring now to FIG. 10, within the housing 30 is a form of circuit interrupter which will provide the suitable connections between the primary of the transformer and the loop connections H1A and H1B. The particular form of the interrupter shown is not material to this invention. Rotatably mounted in parallel relation within the housing 30 are a pair of shafts 82 and 84 of non-conducting material, such as fiberglass impregenated with synthetic resin. Fixedly mounted on each shaft is a contact arm. Shaft 82 carries contact arm B1A and the shaft 84 carries contact arm B1B. Between the two shafts is a bridge 85 of insulating material which may be formed integral with the housing 30. On this bridge are a pair of contacts C1A and C1B, both mounted on a single bracket 87. A bolt 88 extends through the bridge 85, through the bracket 87, and is secured with nuts 89 and 90 between which is carried the fixed terminal 92. A lead 93 extends into the bushing 60 to complete the circuit between the fixed contacts C1A, C1B, and lead 62 which connects with the primary of the transformer. The input leads H1A and H1B are connected, respectively, with hubs D1A and D1B, so that when contact arms B1A and B1B are closed with the fixed contacts C1A and C1B, the circuit is closed between the input leads H1A and H1B as well as to the primary of the transformer. Opening the contact B1B opens the circuit between the input leads H1A and H1B. Opening the contact B1A, not only opens the circuit between the input leads H1A and H1B, but can also open the circuit to the primary of the transformer, if H1B is unconnected to source as shown in FIG. 5.

Each shaft 82 and 84 has a socket 98 at its forward end. Since the sockets are exactly the same and also the actuating mechanism for the shafts 82 and 84, only one will be described. Thus, socket 98 is slotted between radially extending faces 99 and 100 and is provided with an annular recess 101 to receive the head 102 of a shaft 103 arranged axially of the shaft 82. Shaft 104 is connected with the shaft 84 in exactly the same manner.

The contact actuating mechanism is of a conventional type and shown only on shaft 104 and in FIGS. 10 and 12. It will be understood that the same type of actuating mechanism connects the shaft 103 and the shaft 82, but, since the actuators are the same, only one will be described. On shaft 104 is a lever 106 secured to a sleeve 107 in turn fixed on the shaft 104. The other end of lever 106 is bent at right angles to form a lug 109 at right angles to the lever 106. Lug 109 is apertured at 110 to receive one end of push rod 111. The opposite end of push rod 111 is rotatably journalled on a suitable pin 113 secured in the face of a sector shaped member 115 non-rotatably secured to the shaft 84. Surrounding push rod 111 is a compression spring 116 biased between lug 109 and washer 118 on the push rod 111. The sector 115 has radial faces 120 and 121 which in turn abut fixed pins 122 and 123. The forward or outer ends of the actuating shafts 103 and 104 in turn are non-rotatably connected with the knobs 27 and 28, respectively.

In the position of the parts shown in FIG. 12, the contact B1B is open, being held open by the expansive force of the spring 116 acting on the push rod 111 to force the sector 115 into a position in which radial face 120 engages stop 122. In order to close the contact B1B, shaft 104 would be rotated clockwise until lever 106 and push rod 111 passed over center with respect to the pin 113. When this occurs, spring 116 will be fully compressed and under high tension. Once the end of push rod 111 has passed beyond the line of centers between shaft 104 and pin 113, the force of the spring 116 on pin 113 will cause rotation of the sector 115 into its opposite position in which the radial face 121 engages the stop pin 123. To open the contact B1B, actuating shaft 104 and lever 106 are moved in a counterclockwise direction until the end of the lever and push rod 116 again pass over center with respect to the line between the center of shaft 104 and the center of pin 113. At this point again, the spring 116 is fully compressed and once the levers and push rod pass over center, spring 116 snaps the segment 115 into the position shown in FIG. 12 with radial face 120 against stop 122 and, of course, opens the contact B1B. The particular construction of the actuating mechanism is of no direct concern with this invention since any quick make, quick break actuator may be employed to open and close either contact B1A or contact B1B.

All of the bushings, of course, have fluid tight seals as well as the actuating shafts 103 and 104, and, in order to provide arc quenching, preferably the casing 30 is filled with a suitable gas under pressure having arc quenching and high dielectric strength. These gases have been heretofore identified. By the use of gas, contamination of oil is avoided either in the transformer housing or within the circuit interrupter housing. Consequently, this is the fluid preferred.

The above construction described in detail isolates the switch, or circuit interrupter housing, from the transformer housing so as to avoid contamination of the transformer oil by switching operation. It also eliminates the danger of arcing which might ignite the transformer oil.

Since housing 30 is made from a molded non-conductive material, a reduction in cost is accomplished. Expensive transformer bushings are eliminated and an inexpensive mounting provided for the circuit interrupter components.

Mounting plate 55 forms a closure with the housing 30 which is gas tight. It also provides for ready removal of the housing 30 and replacement by another. The removal of the bolts or studs 59 disconnect the housing 30 from the transformer housing 10.

Transparent plate 65 and the use of gas as a dielectric provide for direct observation of the actual components of the circuit interrupter. There can be no mistake due to improper assembly which would mislead one into assuming that the circuit interrupters are open when they are actually closed.

It will be further observed that the use of the non-conductive housing 30 and its integral bushings conserve space. The circuit interrupter components are much smaller than those which are of the air break type. Any saving in space means an over-all reduction in transformer size.

Changes in and modifications of the construction described may be made without departing from the spirit of our invention or sacrificing its advantages.

Having thus described the invention, what is claimed and desired to be secured by Letters Patent is:

In combination with a high voltage loop circuit having a plurality of terminals of the same polarity, an electric transformer having a pair of terminals electrically connected respectively with two of said loop circuit terminals, a fluid-tight tank containing a fluid having dielectric properties, said tank having an aperture therein and a mounting pad surrounding said aperture, electric transformer components including a primary winding and a secondary winding submerged in said fluid within said tank, said primary winding having a terminal selectively connectible with and disconnectible from either or both of said pair of terminals, a fluid-tight housing connected to said tank in alignment with said aperture, said housing including:

(a) a hollow body of insulating material, (b) a mounting plate of insulating material closing one end of said hollow body and secured thereto in fluid-sealing relationship, (c) means for securing said mounting plate on said mounting pad in fluid-sealing relationship about said aperture, (d) a face place of insulating material secured in fluid-sealing relationship to the end of said hollow body opposite said mounting plate, (e) said fluid-tight housing being charged with dielectric fluid different from that in said tank and having both dielectric properties and arc-suppressing properties, said housing containing a pair of independently operable switches enveloped by said dielectric fluid, said switches having a common stationary contact, a conductor extending through said mounting plate electrically connecting said common stationary contact with said primary winding terminal, a movable contact member for each switch, a pair of conductors extending through said hollow body electrically connecting the movable contact member of each switch respectively with one of said pair of terminals whereby:

(1) when both of said switches are in closed circuit position, a series circuit relationship is established between said pair of terminals so that said switches collectively constitute a series connection between two of the terminals in said high voltage loop circuit, (2) when either of said switches is in closed circuit position, the primary of said transformer is energized from the corresponding terminal of said high voltage loop circuit, and (3) when one of said switches is in open circuit position, said high voltage loop circuit is interrupted at the open one of said switches, and means on the exterior of said face plate for moving said switches independently and selectively into and out of closed circuit position.

References Cited by the Examiner

UNITED STATES PATENTS

| | | | |
|---|---|---|---|
| 732,672 | 6/1903 | Ball | 200—150 |
| 759,915 | 5/1904 | Recklinghausen | 200—150 |
| 759,916 | 5/1904 | Recklinghausen | 200—150 |
| 3,014,158 | 12/1961 | Nelson et al. | 317—15 |

MILTON O. HIRSHFIELD, *Primary Examiner.*

SAMUEL BERNSTEIN, *Examiner.*

R. V. LUPO, *Assistant Examiner.*